United States Patent [19]

Enari et al.

[11] Patent Number: 5,528,298
[45] Date of Patent: Jun. 18, 1996

[54] IMAGE ENCODING APPARATUS

[75] Inventors: Masahiko Enari, Yokohama; Kenichi Nagasawa; Akihiro Shikakura, both of Kawasaki; Yuushi Kaneko, Yokohama; Yoshifumi Satake, Yokohama; Hiroshi Takizawa, Yokohama, all of Japan

[73] Assignee: Canon Kabushiki Kaisha, Tokyo, Japan

[21] Appl. No.: 337,442

[22] Filed: Nov. 8, 1994

Related U.S. Application Data

[62] Division of Ser. No. 237,891, May 4, 1994, Pat. No. 5,452,007, which is a division of Ser. No. 32,633, Mar. 17, 1993, Pat. No. 5,333,013, which is a continuation of Ser. No. 829,404, Feb. 3, 1992, Pat. No. 5,251,029.

[30] Foreign Application Priority Data

| Feb. 7, 1991 | [JP] | Japan | 3-016466 |
| May 17, 1991 | [JP] | Japan | 3-113189 |
| May 17, 1991 | [JP] | Japan | 3-113226 |
| Oct. 30, 1991 | [JP] | Japan | 3-284956 |
| Oct. 30, 1991 | [JP] | Japan | 3-284957 |

[51] Int. Cl.[6] ................................. H04N 7/30
[52] U.S. Cl. .............................. 348/405; 375/245
[58] Field of Search ........................... 348/403, 405, 348/419; 375/245; H04N 7/133, 7/30

[56] References Cited

U.S. PATENT DOCUMENTS

| 5,073,820 | 12/1991 | Nakagawa | 348/405 |
| 5,109,451 | 4/1992 | Aono | 348/403 |
| 5,146,324 | 9/1992 | Miller | 348/405 |

Primary Examiner—Howard W. Britton
Attorney, Agent, or Firm—Fitzpatrick Cella Harper & Scinto

[57] ABSTRACT

In an image encoding apparatus, conversion data obtained by converting image information onto a frequency region, and corresponding to several frames are parallelly output using a one-frame-period delay circuit. The parallelly output conversion data are quantized by a quantization circuit, and a data amount to be obtained when the quantized data are encoded is obtained by a variable-length coding circuit. The data amount information is input to a coefficient operation circuit for determining a quantization step of the next stage. Conversion data quantized according to an output from the coefficient operation circuit are encoded, and the encoded data are output.

10 Claims, 12 Drawing Sheets

FIG. 3

| D₁₁ | D₁₂ | D₁₃ | D₁₄ | D₁₅ | D₁₆ | D₁₇ | D₁₈ |
|---|---|---|---|---|---|---|---|
| $D_{11}$ | $D_{12}$ | $D_{13}$ | $D_{14}$ | $D_{15}$ | $D_{16}$ | $D_{17}$ | $D_{18}$ |
| $D_{21}$ | $D_{22}$ | $D_{23}$ | $D_{24}$ | $D_{25}$ | $D_{26}$ | $D_{27}$ | $D_{28}$ |
| $D_{31}$ | $D_{32}$ | $D_{33}$ | $D_{34}$ | $D_{35}$ | $D_{36}$ | $D_{37}$ | $D_{38}$ |
| $D_{41}$ | $D_{42}$ | $D_{43}$ | $D_{44}$ | $D_{45}$ | $D_{46}$ | $D_{47}$ | $D_{48}$ |
| $D_{51}$ | $D_{52}$ | $D_{53}$ | $D_{54}$ | $D_{55}$ | $D_{56}$ | $D_{57}$ | $D_{58}$ |
| $D_{61}$ | $D_{62}$ | $D_{63}$ | $D_{64}$ | $D_{65}$ | $D_{66}$ | $D_{67}$ | $D_{68}$ |
| $D_{71}$ | $D_{72}$ | $D_{73}$ | $D_{74}$ | $D_{75}$ | $D_{76}$ | $D_{77}$ | $D_{78}$ |
| $D_{81}$ | $D_{82}$ | $D_{83}$ | $D_{84}$ | $D_{85}$ | $D_{86}$ | $D_{87}$ | $D_{88}$ |

FIG. 4

| | | | | | | | |
|---|---|---|---|---|---|---|---|
| $X_{11}$ | $X_{12}$ | $X_{13}$ | $X_{14}$ | $X_{15}$ | $X_{16}$ | $X_{17}$ | $X_{18}$ |
| $X_{21}$ | $X_{22}$ | $X_{23}$ | $X_{24}$ | $X_{25}$ | $X_{26}$ | $X_{27}$ | $X_{28}$ |
| $X_{31}$ | $X_{32}$ | $X_{33}$ | $X_{34}$ | $X_{35}$ | $X_{36}$ | $X_{37}$ | $X_{38}$ |
| $X_{41}$ | $X_{42}$ | $X_{43}$ | $X_{44}$ | $X_{45}$ | $X_{46}$ | $X_{47}$ | $X_{48}$ |
| $X_{51}$ | $X_{52}$ | $X_{53}$ | $X_{54}$ | $X_{55}$ | $X_{56}$ | $X_{57}$ | $X_{58}$ |
| $X_{61}$ | $X_{62}$ | $X_{63}$ | $X_{64}$ | $X_{65}$ | $X_{66}$ | $X_{67}$ | $X_{68}$ |
| $X_{71}$ | $X_{72}$ | $X_{73}$ | $X_{74}$ | $X_{75}$ | $X_{76}$ | $X_{77}$ | $X_{78}$ |
| $X_{81}$ | $X_{82}$ | $X_{83}$ | $X_{84}$ | $X_{85}$ | $X_{86}$ | $X_{87}$ | $X_{88}$ |

| $W_{11}$ | $W_{12}$ | $W_{13}$ | $W_{14}$ | $W_{15}$ | $W_{16}$ | $W_{17}$ | $W_{18}$ |
|---|---|---|---|---|---|---|---|
| $W_{21}$ | $W_{22}$ | $W_{23}$ | $W_{24}$ | $W_{25}$ | $W_{26}$ | $W_{27}$ | $W_{28}$ |
| $W_{31}$ | $W_{32}$ | $W_{33}$ | $W_{34}$ | $W_{35}$ | $W_{36}$ | $W_{37}$ | $W_{38}$ |
| $W_{41}$ | $W_{42}$ | $W_{43}$ | $W_{44}$ | $W_{45}$ | $W_{46}$ | $W_{47}$ | $W_{48}$ |
| $W_{51}$ | $W_{52}$ | $W_{53}$ | $W_{54}$ | $W_{55}$ | $W_{56}$ | $W_{57}$ | $W_{58}$ |
| $W_{61}$ | $W_{62}$ | $W_{63}$ | $W_{64}$ | $W_{65}$ | $W_{66}$ | $W_{67}$ | $W_{68}$ |
| $W_{71}$ | $W_{72}$ | $W_{73}$ | $W_{74}$ | $W_{75}$ | $W_{76}$ | $W_{77}$ | $W_{78}$ |
| $W_{81}$ | $W_{82}$ | $W_{83}$ | $W_{84}$ | $W_{85}$ | $W_{86}$ | $W_{87}$ | $W_{88}$ |

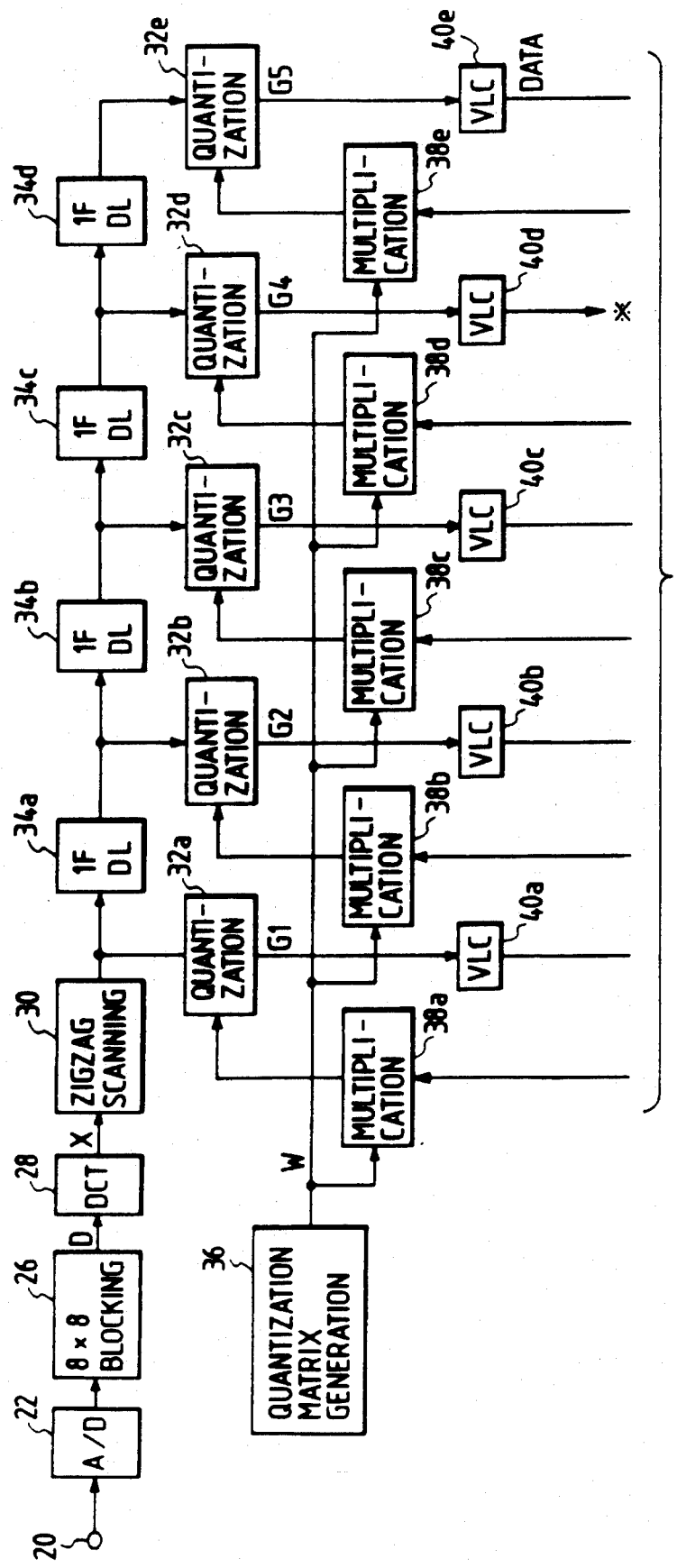

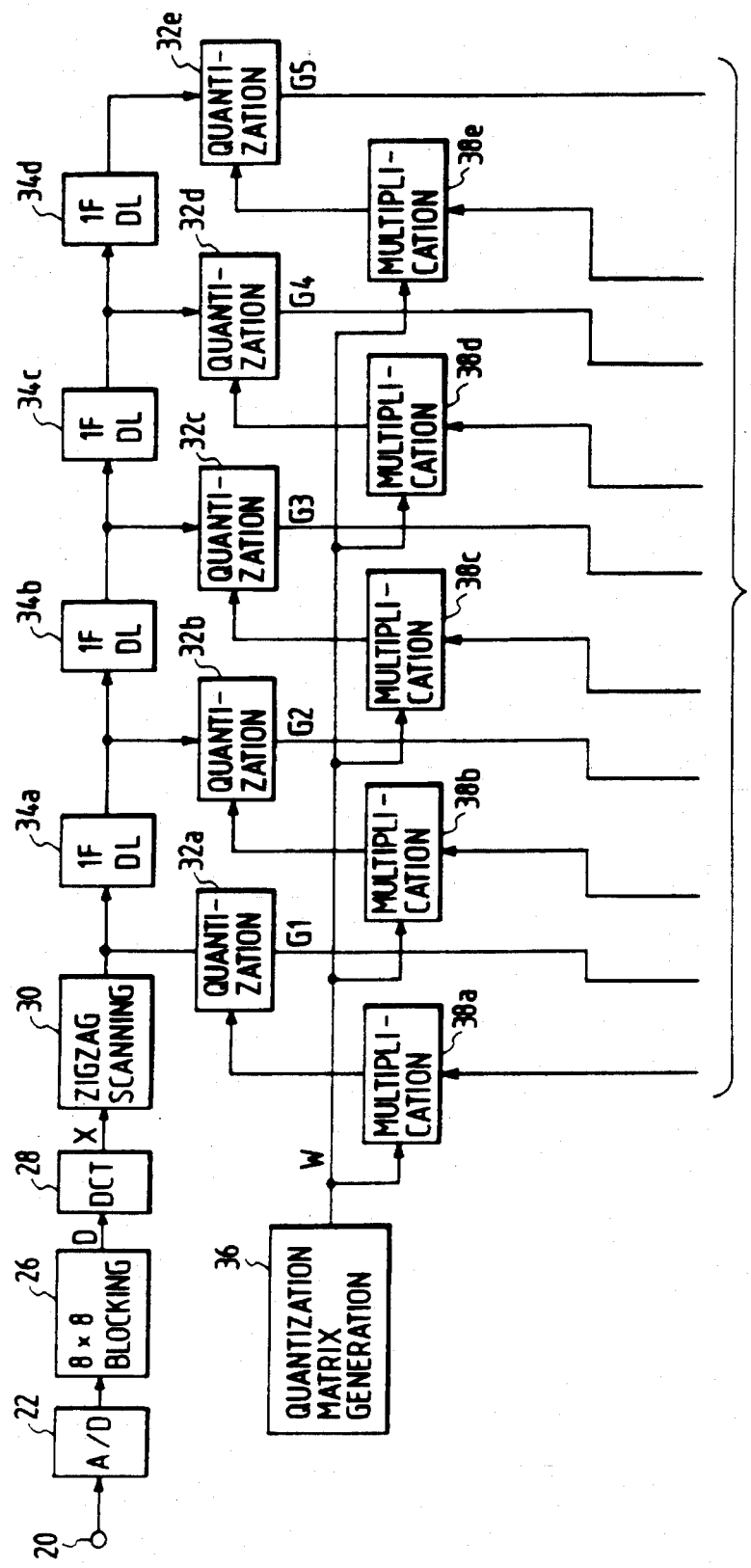

IMAGE ENCODING APPARATUS

This application is a division of application Ser. No. 08/237,891 filed May 4, 1994, now U.S. Pat. No. 5,452,007 which is a division of application Ser. No. 08/032,633 filed Mar. 17, 1993, now U.S. Pat. No. 5,333,013, which is a continuation of application Ser. No. 07/829,404 filed Feb. 3, 1992, now U.S. Pat. No. 5,251,029.

BACKGROUND OF THE INVENTION

1. Field of the Invention

The present invention relates to an image encoding apparatus and, more particularly, to an image encoding apparatus for quantizing conversion data obtained by converting image information onto a frequency region, and variable-length coding the quantized conversion data.

2. Related Background Art

In recent years, as an encoding method of a color image signal, an adaptive DCT (discrete cosine transformation) encoding method has been receiving a lot of attention. An encoding method in the JPEG (Joint Photographic Expert Group) organized as an international standard organization of encoding methods of this type employs the DCT encoding method.

A basic system of an encoding method of this system will be briefly described below.

FIG. 2 is a schematic block diagram for explaining an arrangement of a conventional encoding method using DCT conversion, and FIGS. 3 to 6 are views for explaining processing of the encoding method shown in FIG. 2. An input terminal 2 receives a digital image signal to be encoded, which signal is obtained by raster scanning. The image signal input to the terminal 2 is input to an 8×8 blocking circuit 4, and is two-dimensionally divided into pixel blocks each consisting of (8×8) pixels. The image signal is output to the next circuit in units of pixel blocks.

A DCT conversion circuit 6 DCT-converts the image signal from the blocking circuit 4, and outputs an (8×8) data matrix for a frequency region. More specifically, a pixel block consisting of image data $D_{11}$ to $D_{88}$, as shown in FIG. 3, is converted into a data matrix including $X_{11}$ to $X_{88}$, as shown in FIG. 4, by the circuit 6.

Note that $X_{11}$ represents a DC component in the horizontal and vertical directions of the pixel block, i.e., an average value of this pixel block. If $X_{11}$ to $X_{88}$ are generally represented by $X_{ij}$, a component represented by $X_{ij}$ has a higher frequency in the vertical direction as i is larger, and has a higher frequency in the horizontal direction as j is larger.

The data matrix output from the DCT conversion circuit 6 is input to a linear quantization circuit 8. A quantization matrix generation circuit 18 generates a quantization matrix ($W_{11}$ to $W_{88}$; FIG. 5) indicating weighting coefficients of quantization step sizes for DCT coefficients $X_{11}$ to $X_{88}$, and a coefficient generation circuit 16 generates a coefficient C. The quantization matrix ($W_{11}$ to $W_{88}$), and the coefficient C are input to a multiplication circuit 20. The multiplication circuit 20 calculates ($W_{ij}\times C$), and quantization steps of the linear quantization circuit 8 are determined by outputs $Q_{11}$ to $Q_{88}$ from the multiplication circuit 20. Note that the coefficient C has a positive value, and controls the image quality and generation data amount.

In practice, the linear quantization circuit 8 calculates $X_{ij}/Q_{ij}$, and outputs the calculation results. Assume that the outputs from the linear quantization circuit 8 are represented by $G_{11}$ to $G_{88}$. The quantized conversion data $G_{11}$ to $G_{88}$ are output from a zigzag scanning circuit 10 sequentially from DC components. More specifically, the zigzag scanning circuit 10 outputs, to a variable length coding circuit (VLC) 12, the data $G_{11}$ to $G_{88}$ in the order of $G_{11}$, $G_{12}$, $G_{21}$, $G_{31}$, $G_{22}$, $G_{13}$, $G_{14}$, $G_{23}$, $G_{32}$, $G_{41}$, ..., $G_{85}$, $G_{86}$, $G_{77}$, $G_{68}$, $G_{78}$, $G_{87}$, and $G_{88}$.

The VLC 12 calculates a predicted value for, e.g., a DC component $G_{11}$ among adjacent pixel blocks, and Huffman-encodes a predicted error from the predicted value. Alternatively, the VLC 12 performs equal-length coding of only this DC component. On the other hand, the VLC encodes AC components $G_{12}$ to $G_{88}$ other than the DC component $G_{11}$ while zigzag-scanning quantization outputs from low-frequency components to high-frequency components. The VLC classifies significant coefficients, which do not correspond to a quantization output=0, into groups according to their values, and Huffman-encodes a set of a group identification number, and a run length of the number of insignificant coefficients which correspond to a quantization output=0, and are sandwiched between the immediately preceding significant coefficient and a current significant coefficient. The VLC then adds an equal-length code indicating the position of a value in a group.

In general, since high-frequency components in an 10 oblique direction of an image have a low probability of generation, it can be expected that the latter half portion of $G_{ij}$ after zigzag scanning often becomes 0. Therefore, variable length codes obtained in this manner can be expected to have a very high compression ratio. Assuming a compression ratio between ½ to 1/9 as an average, an image almost free from image quality degradation can be decoded.

On the other hand, a transmission path generally has a predetermined transmission capacity per unit time. When one frame must be transmitted during each predetermined period like in a case wherein motion pictures are to be transmitted, it is desired that a code to be output has a fixed number of bits in units of frames or in units of pixel blocks.

If the above-mentioned coefficient C is increased, a probability that $G_{ij}$ becomes 0 is increased, and a total bit count NB of encoded data is decreased. The relationship between the coefficient C and the total bit count NB is expressed by a monotonous decrease function although it varies depending on images, and it is known that this relationship is represented by a logarithmic curve shown in FIG. 6 for an average image.

The above-mentioned JPEG, and the like propose a method of predicting a coefficient C0 for obtaining a desired total bit count NB0. More specifically, a given coefficient C1 is encoded, and a total bit count nb1 of the obtained code is calculated. A predicted value C2 of C0 is calculated based on nb1 and C1. This calculation can be predicted since the logarithmic curve shown in FIG. 6 passes (C1, nb1).

Upon several repetitions of this operation, an encoding amount including several % of an error from the desired total bit count NB0 can be obtained.

However, processing for repetitively performing encoding to determine the value of the coefficient C0 is time-consuming, and is not suitable for an encoding apparatus, which must transmit one frame during a predetermined period of time like in transmission of motion pictures. In particular, when an image signal having a very high bit rate such as a high-definition television signal is to be processed, such processing is impossible.

SUMMARY OF THE INVENTION

The present invention has been made in consideration of the above situation, and has as its object to provide an image encoding apparatus for quantizing conversion data obtained by converting image information onto a frequency region, and encoding the quantized conversion data, wherein the image encoding apparatus can perform high-speed processing, and can set a data amount in units of frames to be a desired data amount.

For this purpose, according to one preferred aspect of the present invention, an image encoding apparatus comprises conversion means for converting image information into data on a frequency region, parallel output means for parallelly outputting the converted data to output the converted data of a plurality of channels, quantization means for respectively quantizing the converted data of the plurality of channels output from the parallel output means; operation means for calculating a data amount to be obtained when one of the converted data of the plurality of channels output from the quantization means is encoded, coefficient generation means for generating a quantization coefficient for controlling a quantization step of converted data of other channels of the quantization means, and encoding means for encoding at least one of the converted data of the plurality of channels output from the quantization means.

Other objects and advantages of the present invention will become apparent from the detailed description to follow taken in conjunction with the appended claims.

BRIEF DESCRIPTION OF THE DRAWINGS

FIG. 3 is a view showing a pixel block consisting of (8×8) image data;

FIG. 4 is a view showing a DCT-converted data matrix;

DETAILED DESCRIPTION OF THE PREFERRED EMBODIMENTS

The preferred embodiments of the present invention will be described in detail hereinafter with reference to the accompanying drawings.

Figure 1:
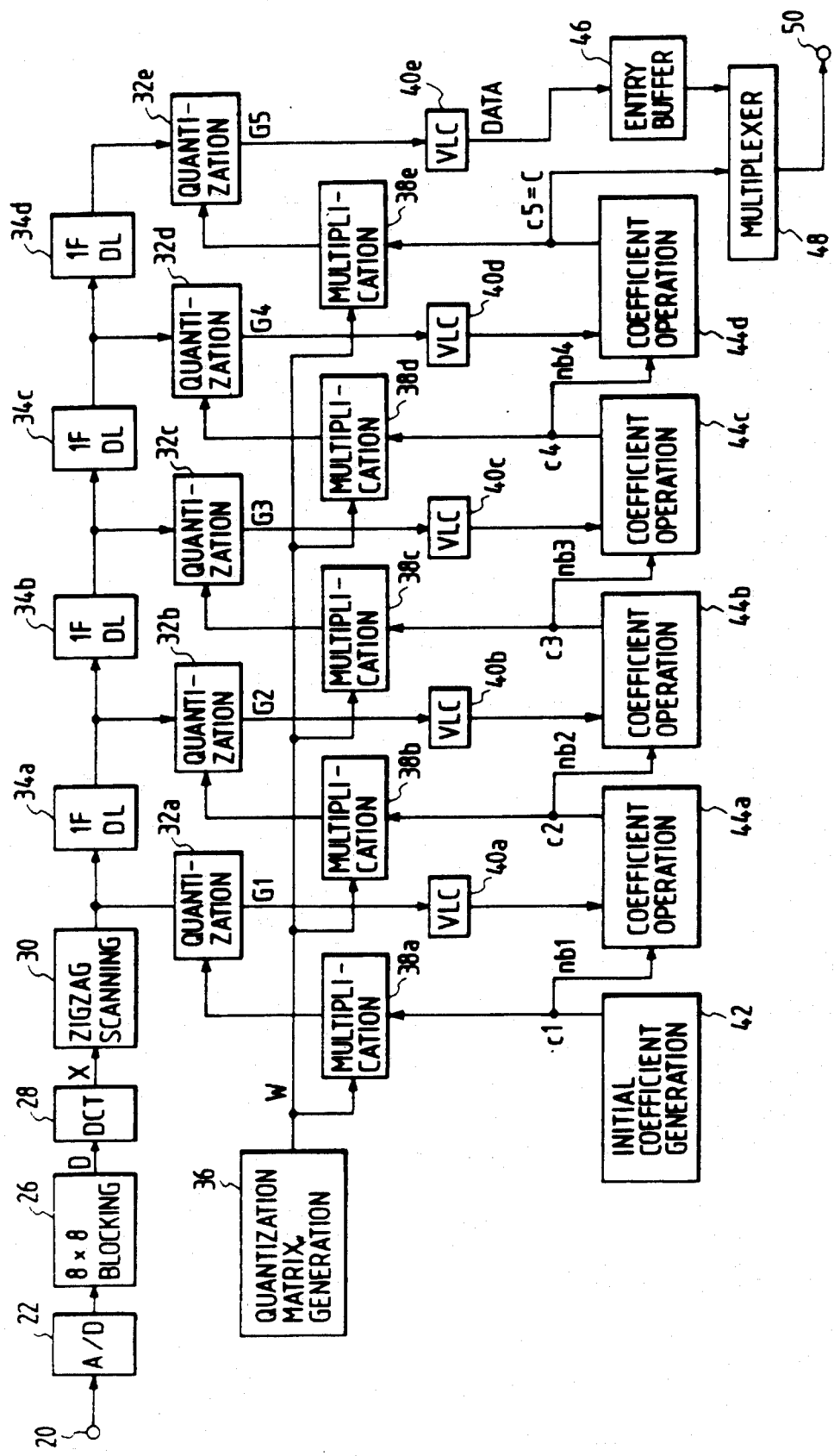
FIG. 1 is a block diagram showing an arrangement of an image encoding apparatus according to the first embodiment of the present invention.

FIG. 1 is a block diagram showing an arrangement of an encoding apparatus according to the first embodiment of the present invention wherein the present invention is applied to a transmission apparatus for transmitting a television signal.

In FIG. 1, an input terminal 20 receives a television signal. The television signal input from the terminal 20 is converted into 8-bit digital data by an A/D converter 22, and is divided into (8×8) pixel blocks by an (8×8) blocking circuit 26 for performing the same operation as that in the blocking circuit shown in FIG. 2. The television signal is supplied to a DCT conversion circuit 28 in units of blocks.

Figure 2:
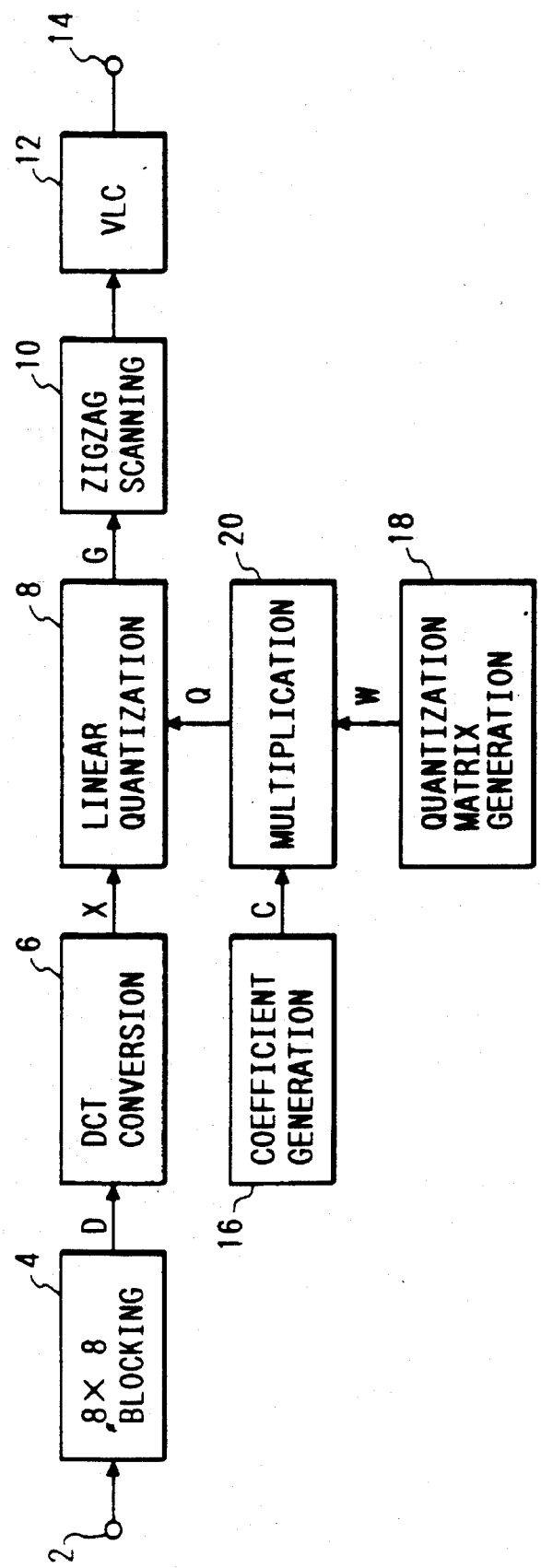
FIG. 2 is a schematic block diagram for explaining an arrangement of a conventional encoding method using DCT conversion.
Figures 5, 6:
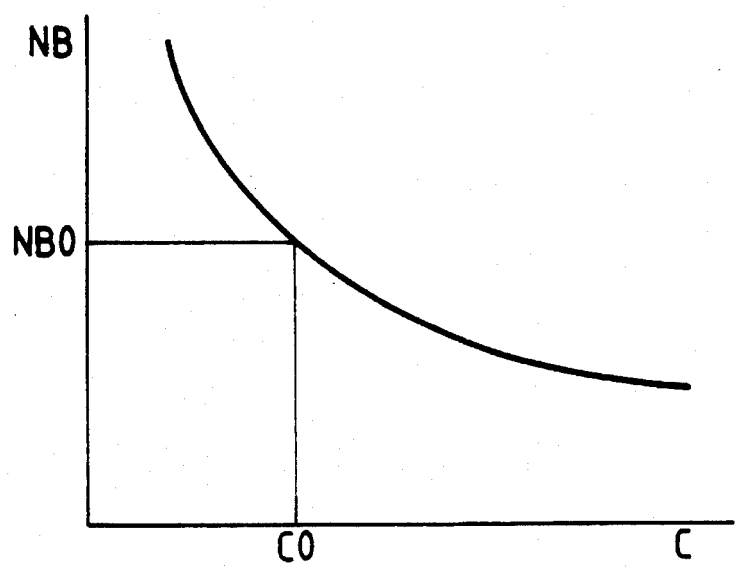
FIG. 5 is a view showing a quantization matrix indicating weighting coefficients of quantization step sizes.
FIG. 6 is a graph showing the relationship between a control coefficient C and a total bit count.

Pixel data $D_{11}$ to $D_{88}$ of each block are converted by the DCT conversion circuit 28 into a data matrix ($X_{11}$ to $X_{88}$) for a frequency region in the same manner as in FIG. 2, and the data matrix is supplied to a zigzag scanning circuit 30. The zigzag scanning circuit 30 performs the same operation as the zigzag scanning circuit 10 shown in FIG. 2, and outputs the DCT-converted data matrix ($X_{11}$ to $X_{88}$) in the order of $X_{11}, X_{12}, X_{21}, X_{31}, X_{22}, X_{13}, X_{14}, X_{23}, X_{32}, X_{41}, \ldots, X_{85}, X_{86}, X_{77}, X_{68}, X_{78}, X_{87}$, and $X_{88}$.

A quantization matrix generation circuit 36 generates the above-mentioned quantization matrix ($W_{11}$ to $W_{88}$). In this embodiment, since already zigzag-scanned data are input to quantization circuits 32a to 32e, quantization matrix data $W_{11}$ to $W_{88}$ are generated in the order corresponding to the zigzag scanning, and are supplied to multiplication circuits 38a to 38e.

The multiplication circuit 38a receives an initial coefficient C1 as the above-mentioned coefficient (control coefficient) C from an initial coefficient generation circuit. In this embodiment, the initial coefficient C1 is set to be "1". When the initial coefficient C1 is set to be "1", since $W_{ij}=Q_{ij}$, the multiplication circuit 38a can be omitted, and the quantization matrix data $W_{11}$ to $W_{88}$ can be directly input to the quantization circuit 32a.

In this manner, the quantization circuit 32a obtains quantization codes $G1_{11}$ to $G1_{88}$ based on the control coefficient C1. These quantized conversion codes $G1_{11}$ to $G1_{88}$ are input to a VLC 40a.

In this embodiment, VLCs 40a to 40d do not output actual encoded data, but output only pieces of total bit count information nb1 to nb4 in units of frames obtained upon execution of the same processing as in the VLC 12 in FIG. 2. The total bit count information nb1 output from the VLC 40a is input to a coefficient operation circuit 44a. Coefficient operation circuits 44a to 44d predict a control coefficient C0 corresponding to a desired total bit count NB0 using the pieces of total bit count information nb1 to nb4 from the VLCs 40a to 40d, the initial coefficient C1, and outputs C2 to C4 from the coefficient operation circuits 44a to 44c, and respectively output control coefficients C2 to C5. The coefficient operation circuits 44a to 44d output the control coefficients C2 to C5, obtained based on conversion data for one frame input to the quantization circuits 32a to 32d, at the input timing of conversion data for the next frame to the quantization circuits 32a to 32d.

On the other hand, circuits (1FDLs) 34a to 34d delay the outputs from the zigzag scanning circuit 30 by one frame period. Therefore, the control coefficient C2 output from the coefficient operation circuit 44a is input to the multiplication circuit 38b at the input timing of conversion data for one frame, which are used for obtaining the control coefficient C2, to the quantization circuit 32b. The multiplication circuit 38b calculates ($W_{ij} \times C$), and inputs the result to the quantization circuit 32b. More specifically, the quantization circuit 32b performs the second quantization for a given frame, and obtains quantization codes $G2_{11}$ to $G2_{88}$ based on the control coefficient C2. The quantized conversion codes $G2_{11}$ to $G2_{88}$ are input to the VLC 40b.

The operations of coefficient operation circuits 44b to 44d, the multiplication circuits 38c to 38e, the 1FDLs 34b to 34d, the VLCs 40b to 40d, and the quantization circuits 32c to 32e are respectively the same as those of the coefficient operation circuit 44a, the multiplication circuit 38b, the 1FDL 34a, the VLC 40a, and the quantization circuit 32b. These circuits sequentially update the predicted value of a desired control coefficient for a given frame.

Thus, the predicted value C5 of the control coefficient obtained from the coefficient operation circuit 44d can be caused to converge to a value very close to the control coefficient C0 corresponding to the desired total bit count NB0. In this embodiment, the control coefficient C5 is supplied to the multiplication circuit 38e as a final control coefficient C. The output from the multiplication circuit 38e is supplied to the quantization circuit 32e. The quantization circuit 32e quantizes the output from the 1FDL 34d, i.e., conversion data, which are delayed by a total of four frame periods, and supplies the quantized data to a VLC 40e.

The VLC 40e actually performs encoding that was described earlier with reference to FIG. 2, and outputs encoded data (DATA). The encoded data are output from an entry buffer 46 at a predetermined bit rate, and are multiplexed with the final control coefficient C by a multiplexer 48. The multiplexed data are then output from a terminal 50 onto a transmission path.

The second embodiment of the present invention will be described below.

Figure 7:
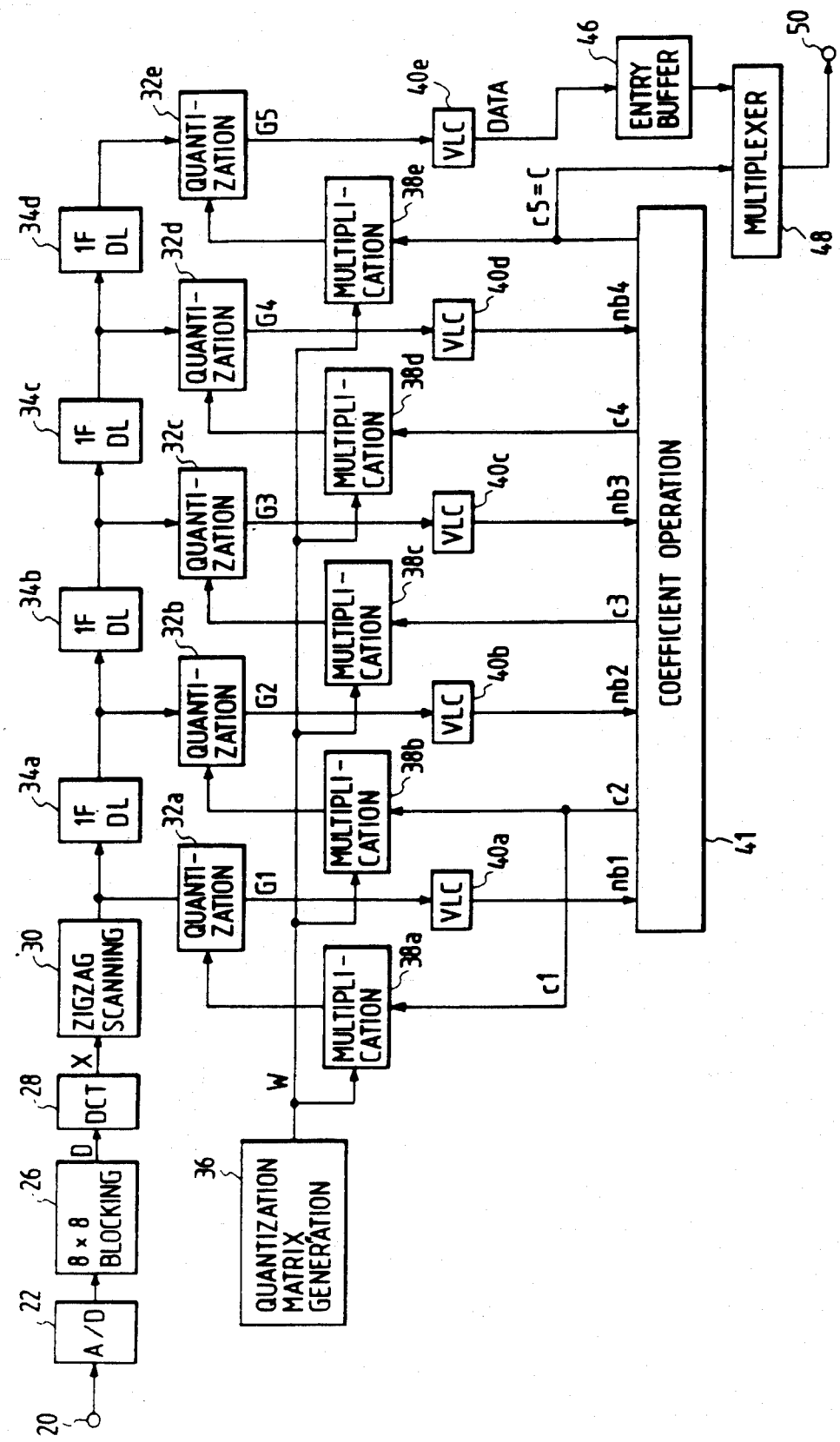
FIG. 7 is a block diagram showing an arrangement of an image encoding apparatus according to the second embodiment of the present invention.

FIG. 7 is a block diagram showing an arrangement of an encoding apparatus according to the second embodiment of the present invention wherein the present invention is applied to a transmission apparatus for transmitting a television signal.

Note that the same reference numerals in FIG. 7 denote the same parts as in FIG. 1, and a detailed description thereof will be omitted.

In this embodiment, a coefficient operation circuit 41 supplies a predicted initial coefficient as the above-mentioned quantization coefficient (control coefficient) C1 to a multiplication circuit 38a. Note that the predicted initial coefficient will be described later. The coefficient operation circuit 41 predicts a control coefficient C0 corresponding to a desired total bit count NB0 using pieces of total bit count information nb1 to nb4 from VLCs 40a to 40d, the initial coefficient C1, and outputs C2 to C4 of this operation circuit 41, and outputs control coefficients C2 to C5. The coefficient operation circuit 41 outputs the control coefficients C2 to C5, obtained based on conversion data for one frame input to quantization circuits 32a to 32d, at the input timing of conversion data for the next frame to the quantization circuits 32a to 32d.

The arrangement and operations of the second embodiment are the same as those of the encoding apparatus of the first embodiment, except for the above-mentioned arrangement and operations.

The predicted initial coefficient will now be described.

In general, motion pictures have a high correlation among frames. For this reason, when adaptive DCT encoding is performed to set a control coefficient (quantization coefficient) so as to maintain a constant total data amount for one picture (one frame), the control coefficients become almost the same among frames.

In this embodiment, by utilizing the high correlation among frames, a value obtained in the immediately preceding frame is used as a control coefficient to be input to the multiplication circuit 38a. Thus, a convergence time of the control coefficients C2 to C5 until an optimum control coefficient is obtained can be shortened, and a more accurate control coefficient can be obtained.

A further detailed explanation will be made below with reference to FIGS. 8A and 8B.

Figure 8B:
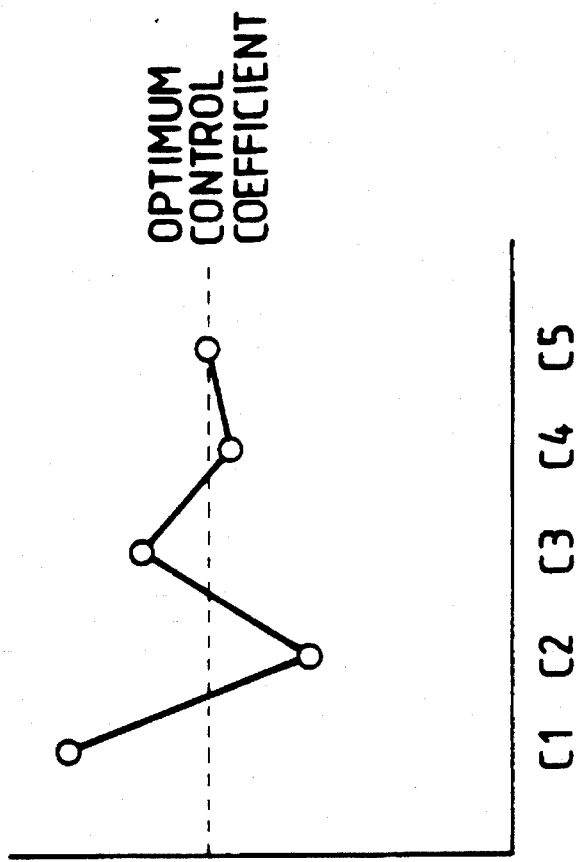
FIGS. 8A and 8B are views for explaining a convergence state of the control coefficient C.
Figure 8A:
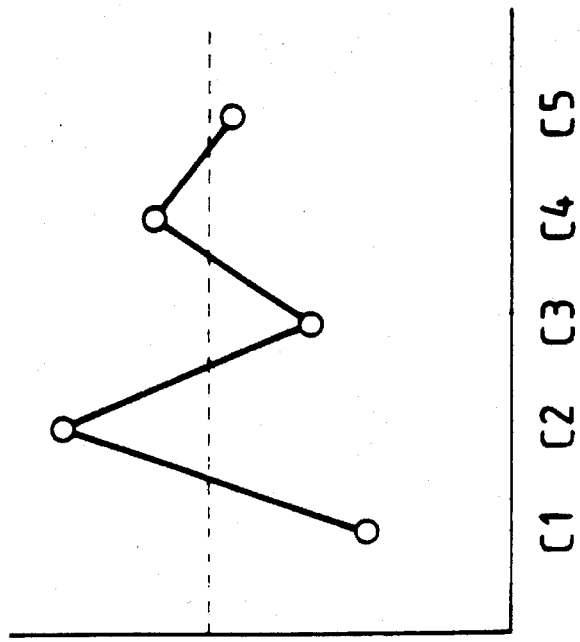

FIG. 8A shows values C1 to C5 when a control coefficient of a given frame is obtained. As can be seen from FIG. 8A, the control coefficient converges to a target optimum control coefficient value while oscillating.

FIG. 8B shows values C1 to C5 when a control coefficient of a frame next to the given frame is obtained. The initially input value C1 is the control coefficient C2 of the immediately preceding frame, i.e., the value C2 (this value will be referred to as a predicted initial coefficient) shown in FIG. 8A. It can be regarded that an optimum control coefficient of this frame is almost the same as that of the immediately preceding frame. Thus, since the value C1 becomes closer to the optimum control coefficient, the convergence time can be shortened, and a value closer to the optimum control coefficient can be obtained.

As the correlation among frames is higher, images having higher image quality can be obtained upon repetition of this operation.

The third embodiment of the present invention will be described below.

Figure 9:
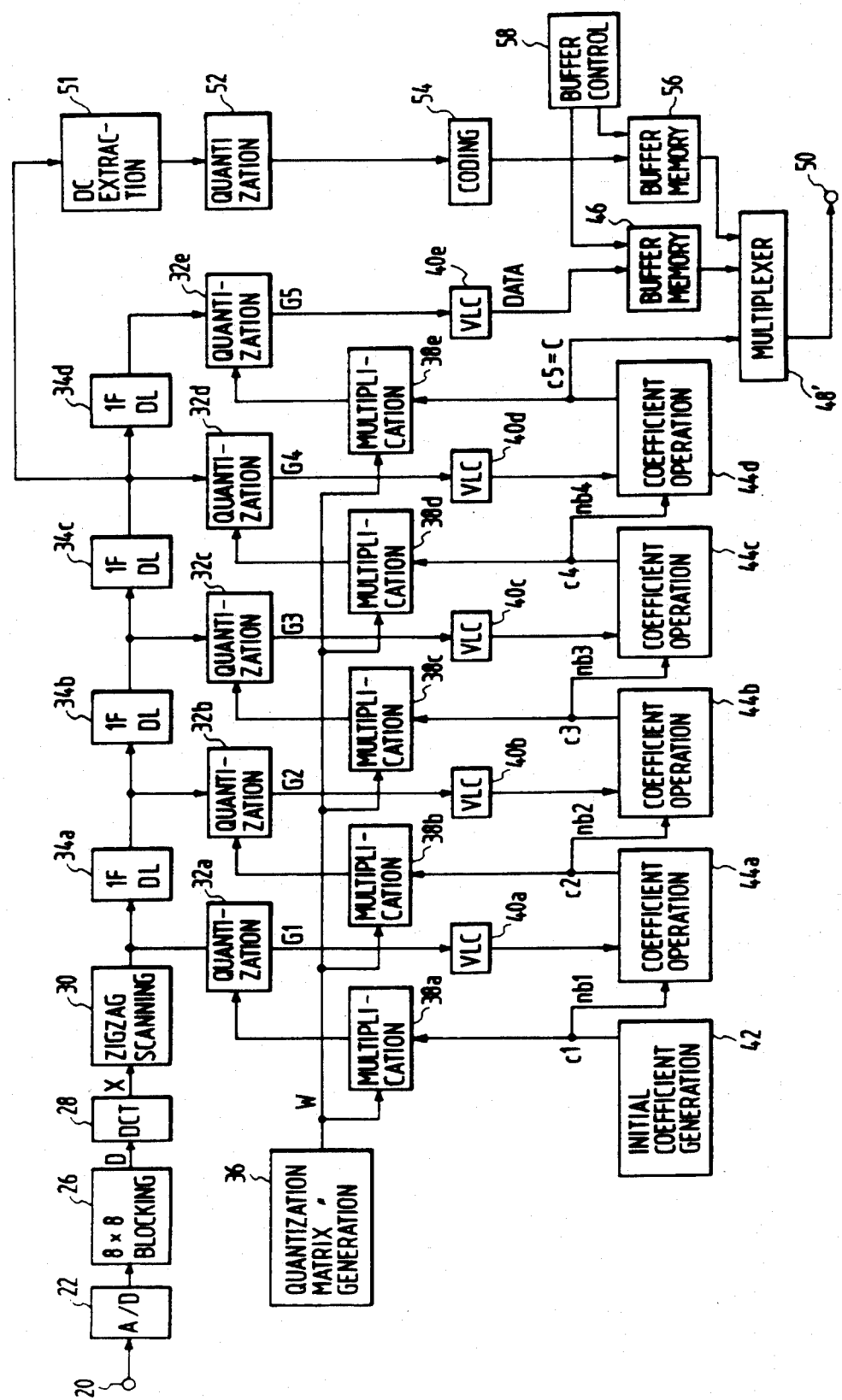
FIG. 9 is a block diagram showing an arrangement of an image encoding apparatus according to the third embodiment of the present invention.

FIG. 9 is a block diagram showing an arrangement of an encoding apparatus according to the third embodiment of the present invention wherein the present invention is applied to a transmission apparatus for transmitting a television signal.

Note that the same reference numerals in FIG. 9 denote the same parts as in FIG. 1, and a detailed description thereof will be omitted.

In FIG. 9, VLCs 40a to 40d of this embodiment calculate total data amounts of only AC components after encoding, and output pieces of total bit count information nb1 to nb4 in units of frames. On the other hand, DC components are equal-length coded.

The operations up to a multiplication circuit 38e, except for the above-mentioned processing operations of the VLCs 40a to 40d, are the same as those in the first embodiment. The processing operations after the multiplication circuit 38e will be described in detail below.

The output from the multiplication circuit 38e is supplied to a quantization circuit 32e. The quantization circuit 32e quantizes outputs from a 1FDL 34d, i.e., at least AC components of conversion data delayed by a total of four frame periods, and supplies quantized data $G5_{12}$ to $G5_{88}$ to a VLC 40e.

The VLC 40e actually performs encoding that was described above with reference to FIG. 2, on AC components $G5_{12}$ to $G5_{88}$, and outputs encoded data (DATA).

On the other hand, DC components are separated from the outputs from a 1FDL 34c by a DC extraction circuit 51, and are input to a quantization circuit 52. The quantization circuit 52 quantizes a DC component $X_{11}$ by a predetermined quantization step independently of the above-mentioned coefficient C, and inputs the quantized component to a coding circuit 54.

The coding circuit 54 equal-length codes the above-mentioned DC component by, e.g., predicted differential encoding. DC component data equal-length coded by the coding circuit 54, and AC component data variable-length coded by the VLC 40e, as described above, are respectively input to buffer memories 56 and 46.

The read operations of encoded data from the memories 46 and 56 are controlled by a buffer control circuit 58. In this case, control is made as follows. That is, as for encoded data for a given frame, all the DC component encoded data of the frame are read out first, and then, AC component encoded data of the same frame are read out.

The relationship between read and write timings of data storm in the memories 46 and 56 will be described below.

Figure 10:
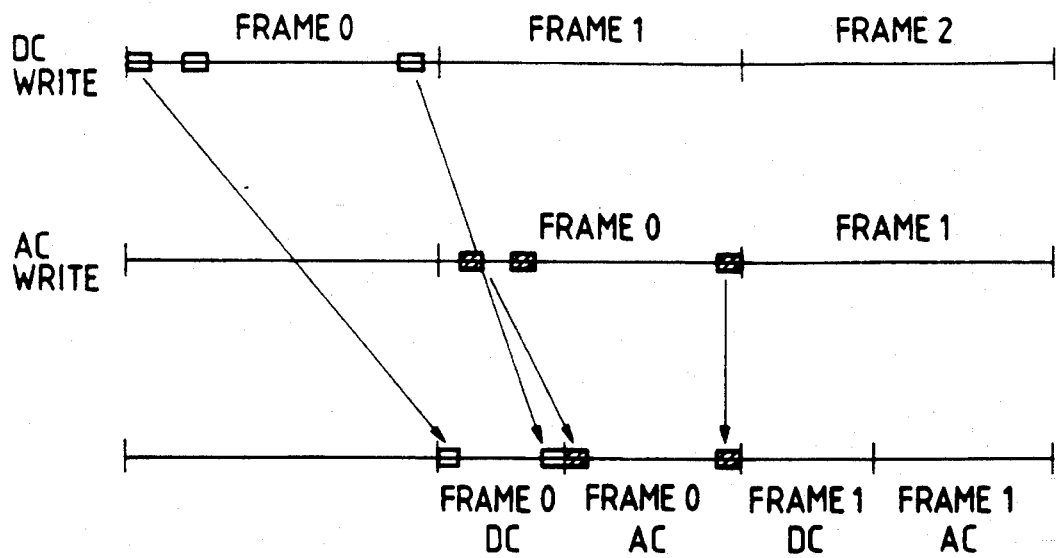
FIG. 10 is a chart for explaining a control operation of a data transmission order in the apparatus shown in FIG. 9.

FIG. 10 is a chart showing the data write timings to the memory 46, i.e., the write timings of AC component encoded data (AC), the data write timings to memory 56, i.e., the write timings of DC component encoded data (DC), and the data read timings from these two memories.

Since DC component encoded data (DATA-2) is quantized by the constant quantization step independently of the above-mentioned coefficient C, quantization can be performed before determination of the final coefficient C in the coefficient operation circuit 44d.

For this reason, in FIG. 9, DC component data are separated and extracted by the DC extraction circuit 51 at the input side of the 1FDL 34d at the final stage, and are quantized by the quantization circuit 52.

Thus, during a period for which AC component encoded data (AC) of a frame of interest are written in the memory 46, DC component encoded data (DC) of the same frame already stored in the memory 56 can be read out prior to the AC component encoded data (AC).

Figure 11:
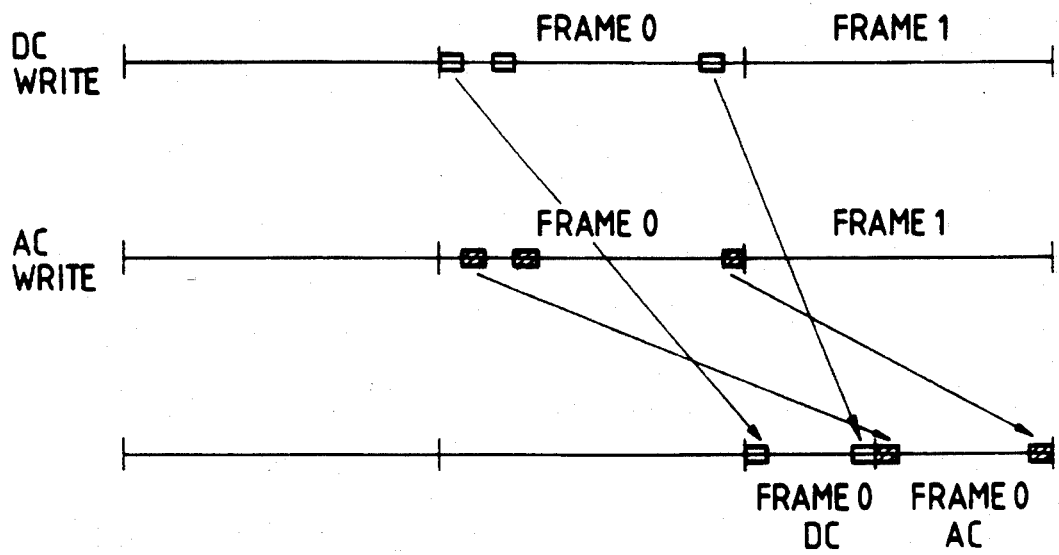
FIG. 11 is a chart for explaining a control operation of a data transmission order of DC and AC components, which are simultaneously obtained.

On the other hand, FIG. 11 is a chart showing the relationship between read and write timings of data corresponding to AC component encoded data (AC) and DC component encoded data (DC) when the AC and DC component data are quantized and encoded during a single frame period without using the DC extraction circuit 51.

In this case, since read access is performed to be delayed by one frame from write access to change the transmission order of data, a capacity for two frames is required for a memory of AC component data.

As can be understood from the above description, a memory capacity required when the transmission order of data is changed in units of frames corresponds to two frames according to the conventional arrangement. However, in this embodiment, a memory having a capacity for one frame need only be arranged for AC component encoded data (AC) so as to change the data transmission order.

Needless to say, the memories 46 and 56 also have a buffer function for reading out data at a predetermined bit rate.

At this time, the buffer control circuit 58 controls to slightly delay the data read start timing of each frame from the write start timing, so that the read addresses of data from the memory 46 do not overtake write addresses.

The AC component encoded data (AC) and the DC component encoded data (DC) read out from the memories 46 and 56, as described above, are multiplexed by a multiplexer 48 together with the final coefficient C, and the multiplexed data are output from a terminal 60 onto a transmission path at a predetermined bit rate.

The fourth embodiment of the present invention will be described below.

Figure 12B:
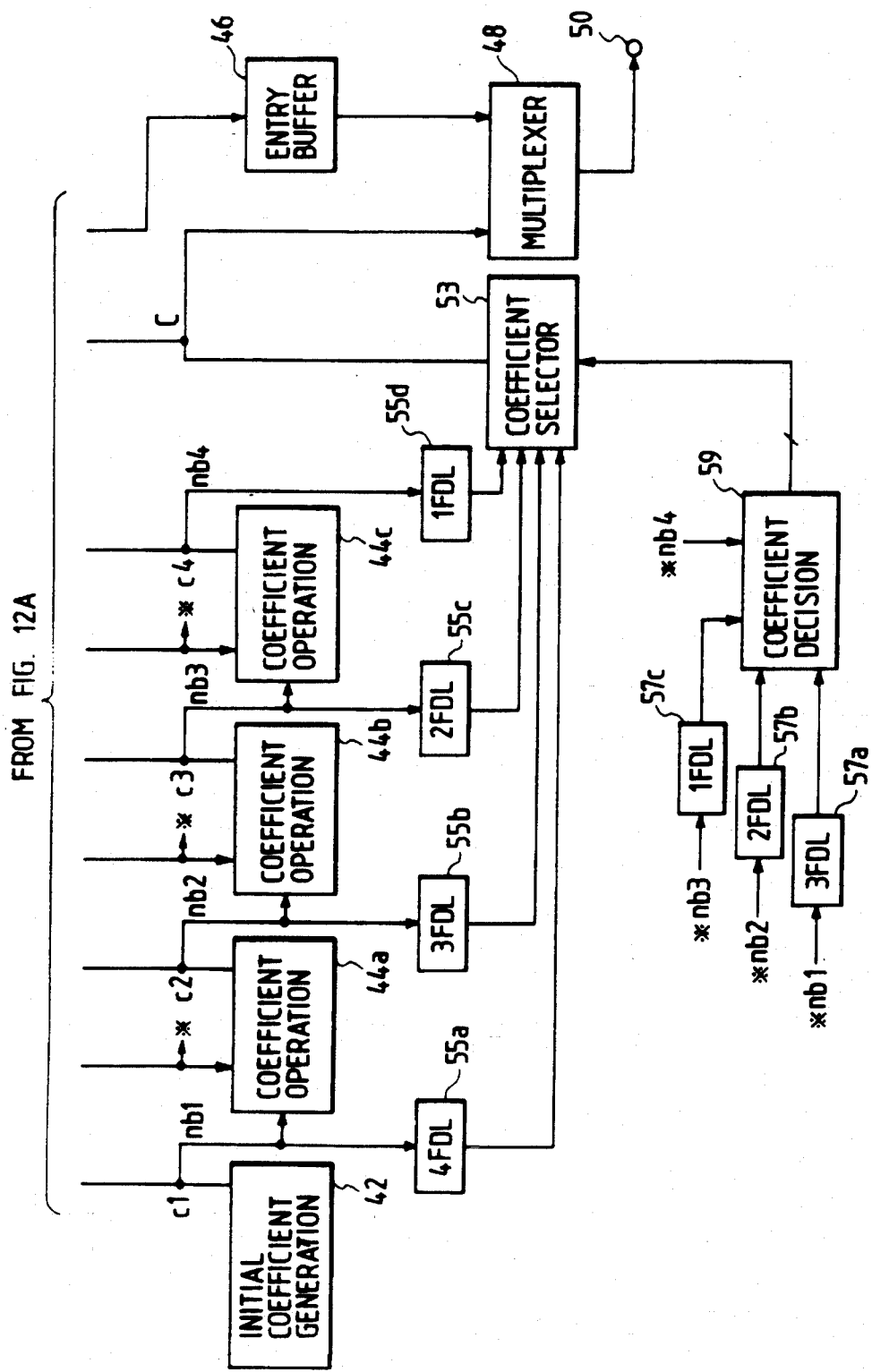
FIG. 12 is a block diagram showing an arrangement of an image encoding apparatus according to the fourth embodiment of the present invention.

FIG. 12 is a block diagram showing an arrangement of an encoding apparatus according to the fourth embodiment of the present invention wherein the present invention is applied to a transmission apparatus for transmitting a television signal.

Note that the same reference numerals in FIG. 12 denote the same parts as in FIG. 1, and a detailed description thereof will be omitted.

This embodiment assumes an apparatus, which does not permit that the total bit count of each frame after variable-length coding exceeds a desired total bit count NB0 even slightly.

Therefore, unlike in the first to third embodiments, a predicted control coefficient is not directly used. This embodiment selects, from control coefficients for a given frame, a control coefficient corresponding to a total bit count after variable-length coding, which is less than and closest to the desired total bit count NB0.

The arrangement and operations except for those associated with this selection are the same as those of the first embodiment.

The operation associated with the above-mentioned selection will be described below.

In FIG. 12, a four-frame period delay circuit (4FDL) 55a, a three-frame period delay circuit (3FDL) 55b, a two-frame period delay circuit (2FDL) 55c, and a one-frame period delay circuit (1FDL) 55d respectively delay control coefficients C1, C2, C3, and C4. With these circuits, the control coefficients C1, C2, C3, and C4 input to a coefficient selector 53 become those for an image of a single frame. These coefficients C1 to C4 are input to the coefficient selector 53 at the input timing of an image of the corresponding frame to a quantization circuit 32e through a 1FDL 34d.

The timings of pieces of total bit count information nb1 to nb4 obtained when quantization and encoding are performed using these control coefficients C1 to C4 are adjusted to each other by a 3FDL 57a, a 2FDL 57b, and a 1FDL 57c. More specifically, the pieces of total bit count (data mount) information nb1 to nb4 corresponding to the control coefficients C1 to C4 input to the coefficient selector 53 are input to a coefficient decision circuit 59 immediately before a period for which these control coefficients C1 to C4 are input to the coefficient selector 53.

The coefficient decision circuit 59 detects information corresponding to a total bit count, which is less than and closest to the desired total bit count NB0, and supplies 2-bit control information to the coefficient selector 53 according to the detection result.

Therefore, the coefficient selector 53 selects a control coefficient corresponding to a total bit count, which is less than and closest to the desired total bit count NB0 upon variable-length coding, from the control coefficients C1 to C4, and outputs the selected coefficient.

In this embodiment, the control coefficient output from the coefficient selector 53 is determined as a final control coefficient C, and is supplied to a multiplication circuit 38e. The output from the multiplication circuit 38e is supplied to the quantization circuit 32e. The quantization circuit 32e quantizes outputs from the 1FDL 34d, i.e., conversion data delayed by a total of four frame periods, and supplies the quantized data to a VLC 40e.

The VLC 40e actually performs encoding that was described above with reference to FIG. 2, and outputs encoded data (DATA). The encoded data are output from an entry buffer 46 at a predetermined bit rate, and are multiplexed with the final control coefficient C by a multiplexer 48. The multiplexed data are then output from a terminal 50 onto a transmission path.

The fifth embodiment of the present invention will be described below.

Figure 13B:
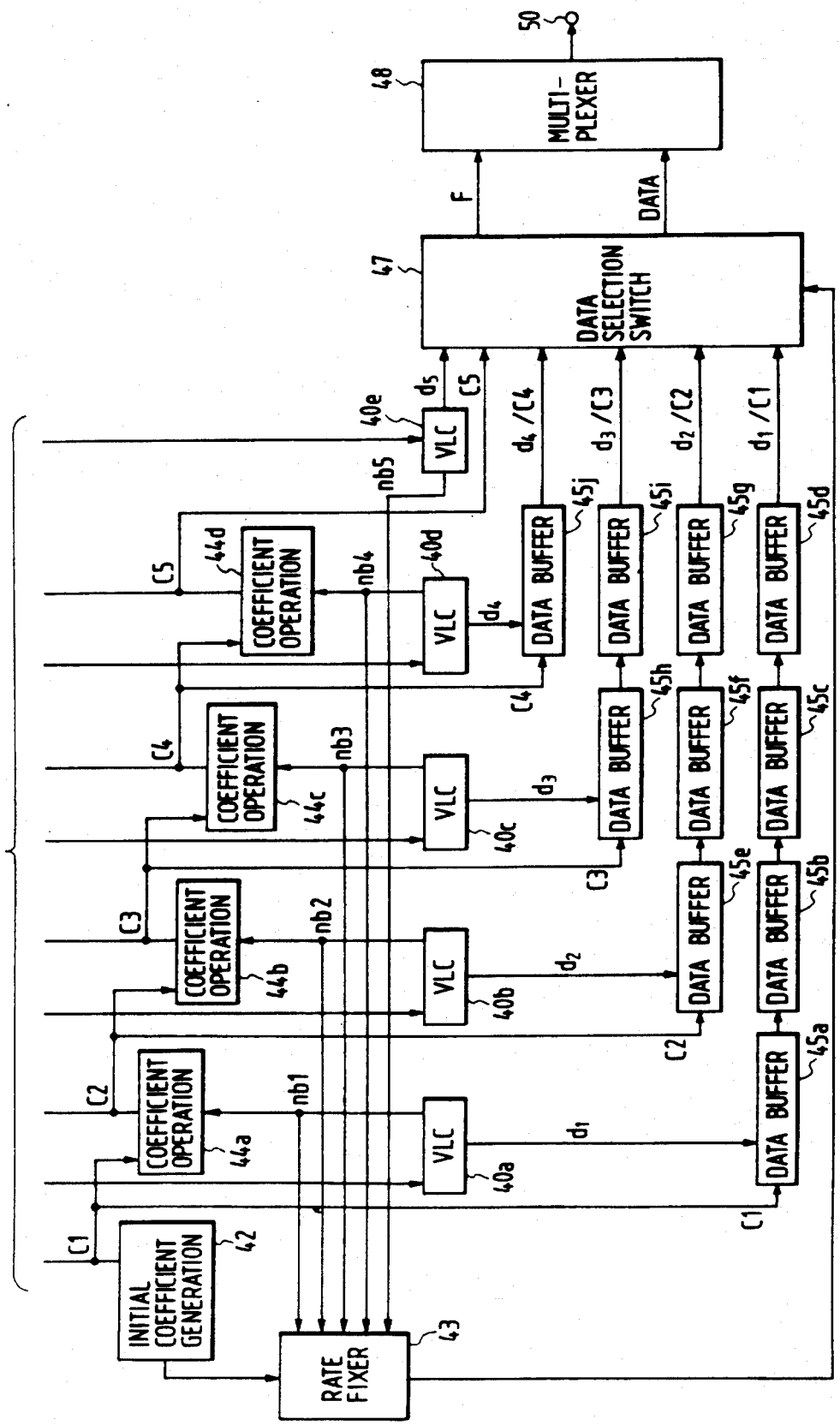
FIG. 13 is a block diagram showing an arrangement of an image encoding apparatus according to the fifth embodiment of the present invention.

FIG. 13 is a block diagram showing an arrangement of an encoding apparatus according to the fifth embodiment of the present invention wherein the present invention is applied to a transmission apparatus for transmitting a television signal.

Note that the same reference numerals in FIG. 13 denote the same parts as in FIG. 1, and a detailed description thereof will be omitted.

This embodiment assumes an apparatus, which does not permit that the total bit count of each frame after variable-length coding exceeds a desired total bit count NB0 even slightly, like in the above-mentioned fourth embodiment.

The arrangement and operations except for those to be described below are the same as those in the first embodiment.

In FIG. 13, VLCs 40a to 40d of this embodiment output pieces of total bit count information in units of frames, and actually encoded codes.

Pieces of total bit count information nb1 to nb5 calculated by the VLCs 40a to 40e are input to a rate fixer 43. The rate fixer 43 discriminates, from nb1 to nb5 for a single frame, total bit count information corresponding to a total bit count, which is equal to or smaller than and closest to NB0, and determines a control coefficient giving the total bit count and encoded codes as a final control coefficient and encoded codes.

Data buffers 45a to 45j are used for supplying encoded codes d1 to d4, output from the VLCs 40a to 40d for the same frame as a frame corresponding to an encoded code d5 output from a VLC 40e, to a data selection switch 47 at the same timing as the encoded code d5. The data buffers 45a to 45j delay (buffer) control coefficients C1 to C4 giving the four encoded codes d1 to d4 for a single frame, so that these control coefficients are supplied to the data selection switch at the same timing as the encoded codes d1 to d4.

The rate fixer 43 controls the data selection switch 47 to output one of the encoded code d5 output from the VLC 40e, and the encoded codes d1, d2, d3, and d4 output from the data buffers 45d, 45g, 45i, and 45j as a final encoded code DATA. In addition to the final encoded code, the data selection switch 47 outputs one of the control coefficient C5 output from a coefficient operation circuit 44d, and the control coefficients C1, C2, C3, and C4 output from the data buffers 45d, 45g, 45i, and 45j as a final control coefficient F.

The encoded code DATA and the control coefficient F are multiplexed by a multiplexer 48, and are output from a terminal 50 onto a transmission path.

According to the arrangement of each of the above embodiments, since the control coefficient C is not fed back at all, a period required for processing for one frame can become the same as that of processing using a constant control coefficient C although a calculation of the control coefficient C for a single frame is performed five times. Thus, very high-speed processing can be realized.

In the third embodiment, the data transmission order can be changed, i.e., DC component encoded data (DC) can be output prior to AC component data using a small memory capacity.

Note that various modifications of the present invention may be made without departing from the spirit and the principal features of the invention.

For example, in order to realize very high-speed processing, the control coefficient F is determined in units of frames. However, if there is a margin for a processing time, a unit (period) for determining the value of the control coefficient F can be decreased (shortened).

In each of the above embodiments, the coefficient operation circuits 44b to 44d predict the desired control coefficient C0 using the coefficients C2 to C4 output from the coefficient operation circuits 44a to 44c, and the pieces of total bit count information nb2 to nb4 obtained when quantization and variable-length coding are performed according to the coefficients C2 to C4. These circuits can more accurately predict the control coefficient using coefficients and total bit count information at the immediately preceding stages in addition to the above-mentioned coefficients and information. For example, if the coefficient operation circuit 44b uses the coefficients C1 and C2 and the pieces of total bit count information nb1 and nb2 so as to calculate the coefficient C3, the coefficient C0 can be predicted more accurately.

In each of the above embodiments, in order to parallelly output DCT-converted data X having a time difference of one frame period, the 1FDLs 34a to 34d are series-connected at the output side of the DCT conversion circuit 28 and the zigzag scanning circuit 30. When the number of bits of the DCT-converted data X must be increased, a plurality of 1FDLs may be connected in series at the output side of the (8×8) blocking circuit 26 so as to save the memory capacity of the 1FDLs, and the outputs of the 1FDLs may be connected to the DCT conversion circuit and the zigzag scanning circuit.

In the fifth embodiment, the encoded code output from the VLCs 40a to 40e for a single frame can be output. In practice, the same effect can be obtained in such a manner that the encoded codes from only the VLCs 40d and 40d can be output, or the encoded codes 10 output from the VLCs 40c to 40e can be selectively output. In this case, the capacity of each data buffer can be decreased as compared to the embodiment shown in FIG. 13, and an increase in hardware size can be suppressed.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An image processing apparatus, comprising:
   a) dividing means for dividing image data of an input picture into a plurality of blocks;
   b) a plurality of code quantity estimation means for estimating code quantity of data provided by coding the blocks by different quantization steps; and
   c) determination means for determining the quantization step to be used for the code quantity estimation of the blocks by referring to the quantization step used for the code quantity estimation of the other blocks.

2. An apparatus according to claim 1, further comprising quantization matrix generation means for providing a common quantization matrix to said plurality of code quantity estimation means.

3. An apparatus according to claim 1, wherein each of plurality of code quantity estimation means includes quantization means for quantizing data of the block divided by said dividing means.

4. An apparatus according to claim 1, wherein said dividing means includes orthogonal transform means for orthogonally transforming data of the blocks.

5. An apparatus according to claim 4, wherein said plurality of code quantity estimation means perform an estimation operation on an A.C. component of transform data output from said orthogonal transform means.

6. An apparatus according to claim 4, wherein said orthogonal transform means performs discrete cosine transformation.

7. An apparatus according to claim 1, further comprising control means for controlling the quantization step of one of said plurality of code quantity estimation means according to an output of another one of said plurality of code quantity estimation means.

8. An apparatus according to claim 7, wherein said control means includes generation means for generating quantization control information for control of the quantization step.

9. An apparatus according to claim 8, further comprising coding means for coding the data of the blocks by using the quantization control information generated by said generation means.

10. An apparatus according to claim 9, further comprising multiplexing means for multiplexing coded data output from said coding means and the quantization control information used to obtained the coded data.

* * * * *

UNITED STATES PATENT AND TRADEMARK OFFICE
CERTIFICATE OF CORRECTION

PATENT NO. : 5,528,298
DATED : June 18, 1996
INVENTOR(S) : Masahiko Enari, et. al.

It is certified that error appears in the above-indentified patent and that said Letters Patent is hereby corrected as shown below:

Title page,
AT [56] REFERENCES CITED

"Fitzpatrick Cella Harper & Scinto" should read
--Fitzpatrick, Cella, Harper & Scinto--.

COLUMN 2

Line 24, "10" should be deleted.

COLUMN 7

Line 13, "storm" should read --stored--.

COLUMN 8

Line 39, "mount)" should read --amount)--.

COLUMN 9

Line 13, "apparatus," should read --apparatus--.

COLUMN 10

Line 36, "10" should be deleted.
Line 67, "plurality" should read --said plurality--.

COLUMN 11

Line 7, "perform" should read --performs--.

UNITED STATES PATENT AND TRADEMARK OFFICE
CERTIFICATE OF CORRECTION

PATENT NO. : 5,528,298
DATED : June 18, 1996
INVENTOR(S) : Masahiko Enari, et. al.

It is certified that error appears in the above-indentified patent and that said Letters Patent is hereby corrected as shown below:

Column 12, line 13, "obtained" should read --obtain--.

Signed and Sealed this

Twenty-second Day of October, 1996

*Attest:*

BRUCE LEHMAN

*Attesting Officer*   *Commissioner of Patents and Trademarks*